(12) United States Patent
Saito et al.

(10) Patent No.: US 10,481,371 B2
(45) Date of Patent: Nov. 19, 2019

(54) IMAGING LENS AND IMAGING APPARATUS

(71) Applicant: FUJIFILM Corporation, Tokyo (JP)

(72) Inventors: Hiroki Saito, Saitama (JP); Shunsuke Miyagishima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 73 days.

(21) Appl. No.: 15/873,364

(22) Filed: Jan. 17, 2018

(65) Prior Publication Data

US 2018/0210178 A1 Jul. 26, 2018

(30) Foreign Application Priority Data

Jan. 20, 2017 (JP) .................................. 2017-008167

(51) Int. Cl.
| | |
|---|---|
| *G02B 9/12* | (2006.01) |
| *G02B 13/06* | (2006.01) |
| *G02B 3/00* | (2006.01) |
| *G02B 9/64* | (2006.01) |
| *G02B 15/14* | (2006.01) |
| *G02B 3/04* | (2006.01) |

(52) U.S. Cl.
CPC ........... *G02B 13/06* (2013.01); *G02B 3/0037* (2013.01); *G02B 3/04* (2013.01); *G02B 9/64* (2013.01); *G02B 15/14* (2013.01); *G02B 2207/117* (2013.01)

(58) Field of Classification Search
CPC ...... G02B 13/06; G02B 13/0045; G02B 9/64; G02B 3/04; G02B 3/0037; G02B 15/14; G02B 2207/117
See application file for complete search history.

(56) References Cited

U.S. PATENT DOCUMENTS

2009/0015938 A1\* 1/2009 Harada .................. G02B 13/06
359/676

FOREIGN PATENT DOCUMENTS

| JP | 2013-029658 A | 2/2013 |
|---|---|---|
| JP | 2014-095841 A | 5/2014 |

\* cited by examiner

*Primary Examiner* — Joseph P Martinez
(74) *Attorney, Agent, or Firm* — Studebaker & Brackett PC

(57) ABSTRACT

The imaging lens consists of a first lens group fixed to an image plane during focusing, an aperture stop, a second lens group having a positive refractive power which moves along an optical axis during focusing, and a third lens group fixed to the image plane during focusing, in order from an object side. The first lens group includes at least two negative lenses among three lenses from a lens closest to the object side to a third lens, a negative lens of the at least two negative lenses closest to the object side being a negative meniscus lens with its convex surface toward the object side, the second lens group includes at least three lenses, and the third lens group includes at least three lenses.

20 Claims, 6 Drawing Sheets

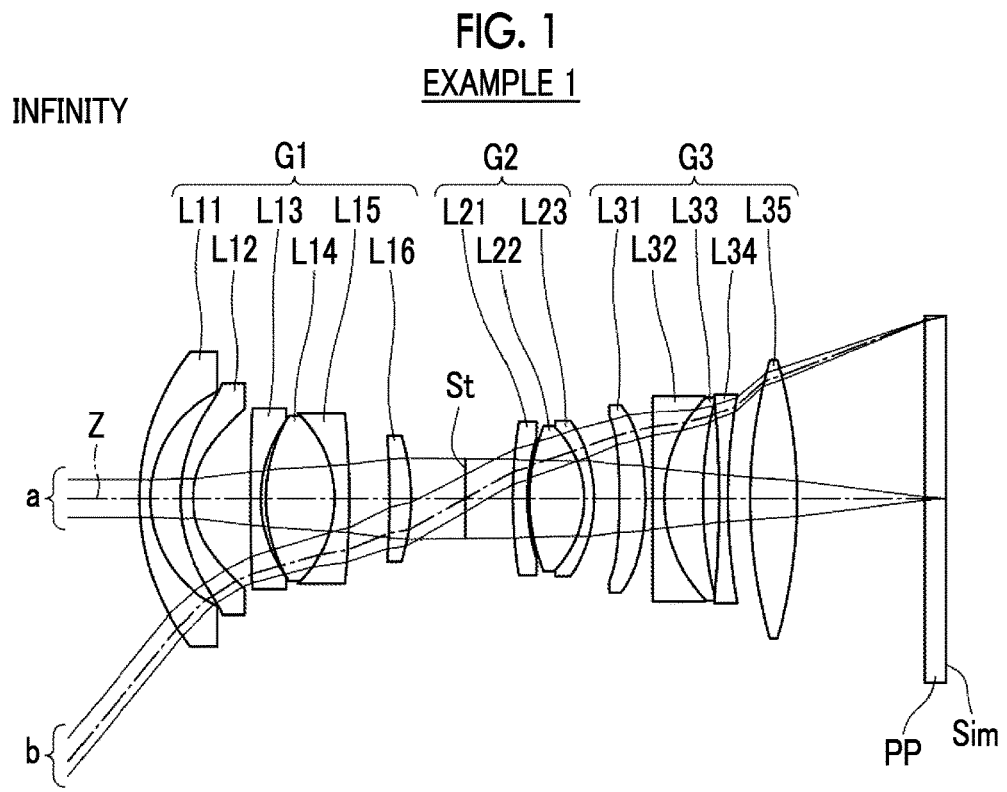
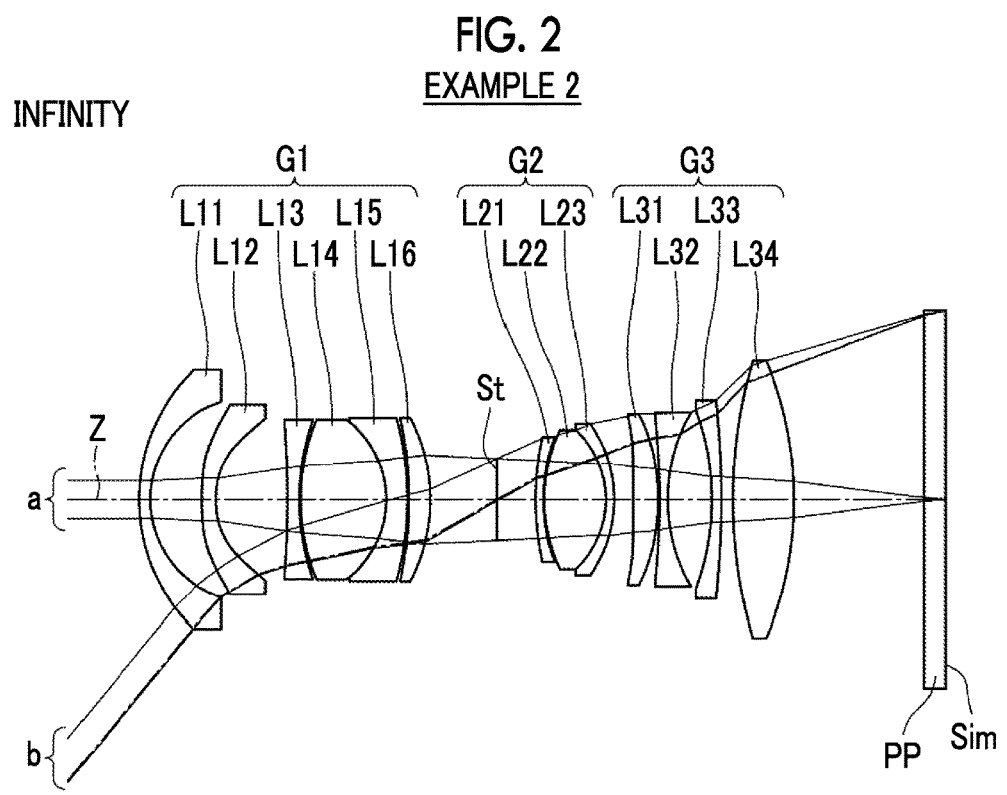

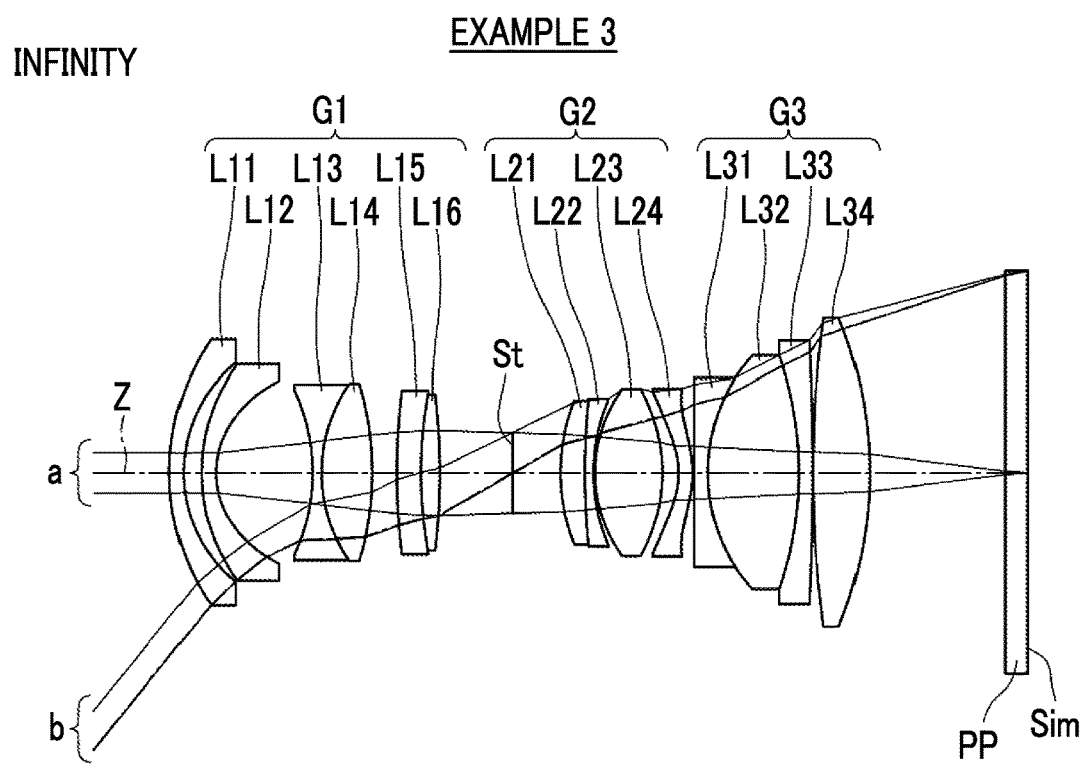

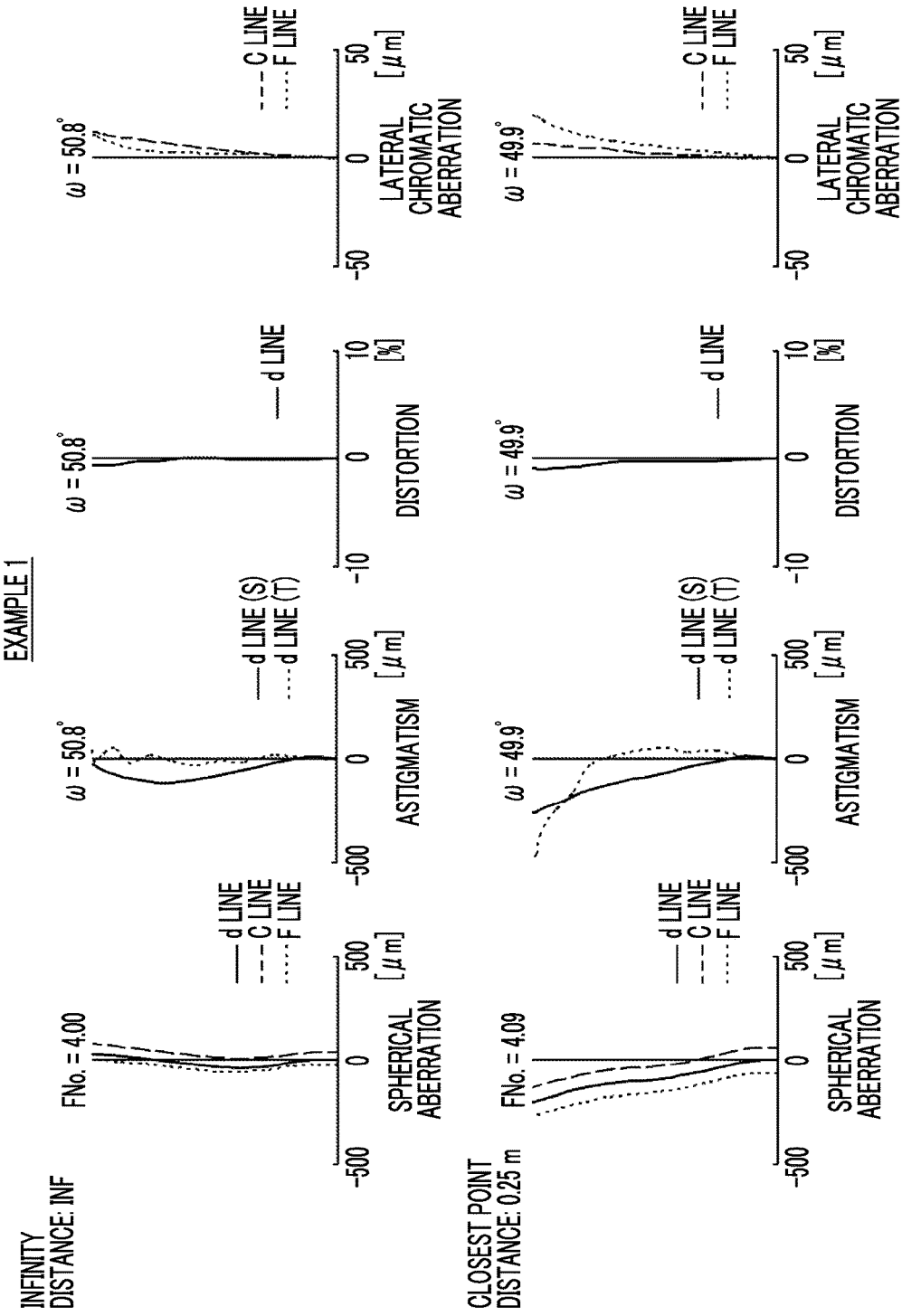

EXAMPLE 2

IMAGING LENS AND IMAGING APPARATUS

CROSS REFERENCE TO RELATED APPLICATIONS

The present application claims priority under 35 U.S.C. § 119 to Japanese Patent Application No. 2017-008167 filed on Jan. 20, 2017. The above application is hereby expressly incorporated by reference, in its entirety, into the present application.

BACKGROUND OF THE INVENTION

1. Field of the Invention

The present invention relates to an imaging lens suitable for an electronic camera such as a motion-picture camera, a broadcast camera, a digital camera, a video camera, or a surveillance camera, and an imaging apparatus including this imaging lens.

2. Description of the Related Art

In recent years, in imaging lenses used in a digital camera or the like, higher-resolution lens systems have been required with an increase in the number of pixels of an imaging device. However, since an increase in the number of lenses and/or an increase in the size of a lens are required for realizing an increase in resolution, an increase in the weight of a lens costs a lens group its movement speed during focusing, and thus focusing speed often decreases.

For this reason, in view of the above problem in an imaging lens, a lens system is proposed in which a lens group just behind a stop which is small in effective diameter and has a tendency to be made lightweight is used as a focusing group (for example, JP2013-29658A or JP2014-95841A).

SUMMARY OF THE INVENTION

However, in the above-described lens system, in a case where a wider-angle lens is attempted to be realized, there is a problem in that a field curvature is generated, and that an increase in resolution is not likely to be realized.

The present invention has been contrived in view of such circumstances, and an object thereof is to provide a high-resolution and wider-angle imaging lens and an imaging apparatus including this imaging lens.

According to the present invention, there is provided an imaging lens comprising, in order from an object side: a first lens group fixed to an image plane during focusing; a stop; a second lens group having a positive refractive power which moves along an optical axis during focusing; and a third lens group fixed to the image plane during focusing, wherein the first lens group includes at least two negative lenses among three lenses from a lens closest to the object side to a third lens, a negative lens of the at least two negative lenses closest to the object side being a negative meniscus lens with its convex surface toward the object side, the second lens group includes at least three lenses, and the third lens group includes at least three lenses.

In the imaging lens of the present invention, in a case where a focal length of the whole system is set to f, and a focal length of the second lens group is set to f2, it is preferable to satisfy the following Conditional Expression (1), and more preferable to satisfy the following Conditional Expression (1-1) or (1-2).

$$0.1 < f/f2 < 0.6 \tag{1}$$

$$0.25 < f/f2 < 0.55 \tag{1-1}$$

$$0.4 < f/f2 < 0.52 \tag{1-2}$$

In addition, in a case where a distance on the optical axis from the stop to the image plane is set to BS, a focal length of the whole system is set to f, and a half angle of view of the whole system is set to ω, it is preferable to satisfy the following Conditional Expression (2), and more preferable to satisfy the following Conditional Expression (2-1).

$$2 < BS/(f \cdot \tan \omega) < 3 \tag{2}$$

$$2.2 < BS/(f \cdot \tan \omega) < 2.8 \tag{2-1}$$

In addition, in a case where a focal length of the second lens group is set to f2, and a focal length of the third lens group is set to f3, it is preferable to satisfy the following Conditional Expression (3), and more preferable to satisfy the following Conditional Expression (3-1).

$$-0.2 < f2/f3 < 0.2 \tag{3}$$

$$-0.16 < f2/f3 < 0.16 \tag{3-1}$$

In addition, in a case where a focal length of the second lens group is set to f2, and a focal length of the first lens group is set to f1, it is preferable to satisfy the following Conditional Expression (4), and more preferable to satisfy the following Conditional Expression (4-1).

$$0 < f2/f1 < 1.5 \tag{4}$$

$$0.3 < f2/f1 < 0.9 \tag{4-1}$$

In addition, in a case where an Abbe number of a positive lens of the second lens group is set to ν2p, it is preferable that the second lens group includes at least one positive lens satisfying the following Conditional Expression (5), and more preferable that the second lens group includes at least one positive lens satisfying the following Conditional Expression (5-1).

$$70 < \nu 2p < 100 \tag{5}$$

$$80 < \nu 2p < 95 \tag{5-1}$$

In addition, it is preferable that the third lens group includes a positive lens closest to an image side.

In addition, it is preferable that the first lens group includes at least two positive lenses.

In addition, it is preferable the first lens group is configured such that two lenses from the lens closest to the object side to a second lens are negative lenses, and more preferable that the first lens group is configured such that three lenses from the lens closest to the object side to the third lens are negative lenses.

In addition, it is preferable that the second lens group consists of three or four lenses.

In addition, it is preferable that the third lens group consists of four or five lenses.

According to the present invention, there is provided an imaging apparatus comprising the imaging lens of the present invention.

Meanwhile, the term "consist of ~" is intended to be allowed to include a lens having substantially no power, optical elements, other than a lens, such as a stop, a mask, cover glass, or a filter, mechanism portions such as a lens flange, a lens barrel, an imaging device, or a camera-shake correction mechanism, and the like, in addition to the things enumerated as components.

In addition, the term "lens group" is not necessarily constituted by a plurality of lenses, and may be constituted by only one lens. In addition, the sign of the refractive power of the lens group, the sign of the refractive power of the lens, and the surface shape of the lens are assumed to be those in a paraxial region in a case where an aspherical surface is included. In addition, the sign of the curvature radius is set to be positive in a case where a surface shape is convex on the object side, and is set to be negative in a case where a surface shape is convex on the image side.

According to the present invention, there is provided an imaging lens comprising, in order from an object side: a first lens group fixed to an image plane during focusing; a stop; a second lens group having a positive refractive power which moves along an optical axis during focusing; and a third lens group fixed to the image plane during focusing, wherein the first lens group includes at least two negative lenses among three lenses from a lens closest to the object side to a third lens, a negative lens of the at least two negative lenses closest to the object side being a negative meniscus lens with its convex surface toward the object side, the second lens group includes at least three lenses, and the third lens group includes at least three lenses. Therefore, it is possible to provide a high-resolution and wider-angle imaging lens and an imaging apparatus including this imaging lens.

BRIEF DESCRIPTION OF THE DRAWINGS

FIG. 1 is a cross-sectional view illustrating a configuration of an imaging lens (in common with that of Example 1) according to an embodiment of the present invention.

FIG. 2 is a cross-sectional view illustrating a configuration of an imaging lens of Example 2 of the present invention.

FIG. 3 is a cross-sectional view illustrating a configuration of an imaging lens of Example 3 of the present invention.

FIG. 4 is a diagram of aberrations of the imaging lens of Example 1 of the present invention.

DESCRIPTION OF THE PREFERRED EMBODIMENTS

Figure 5:
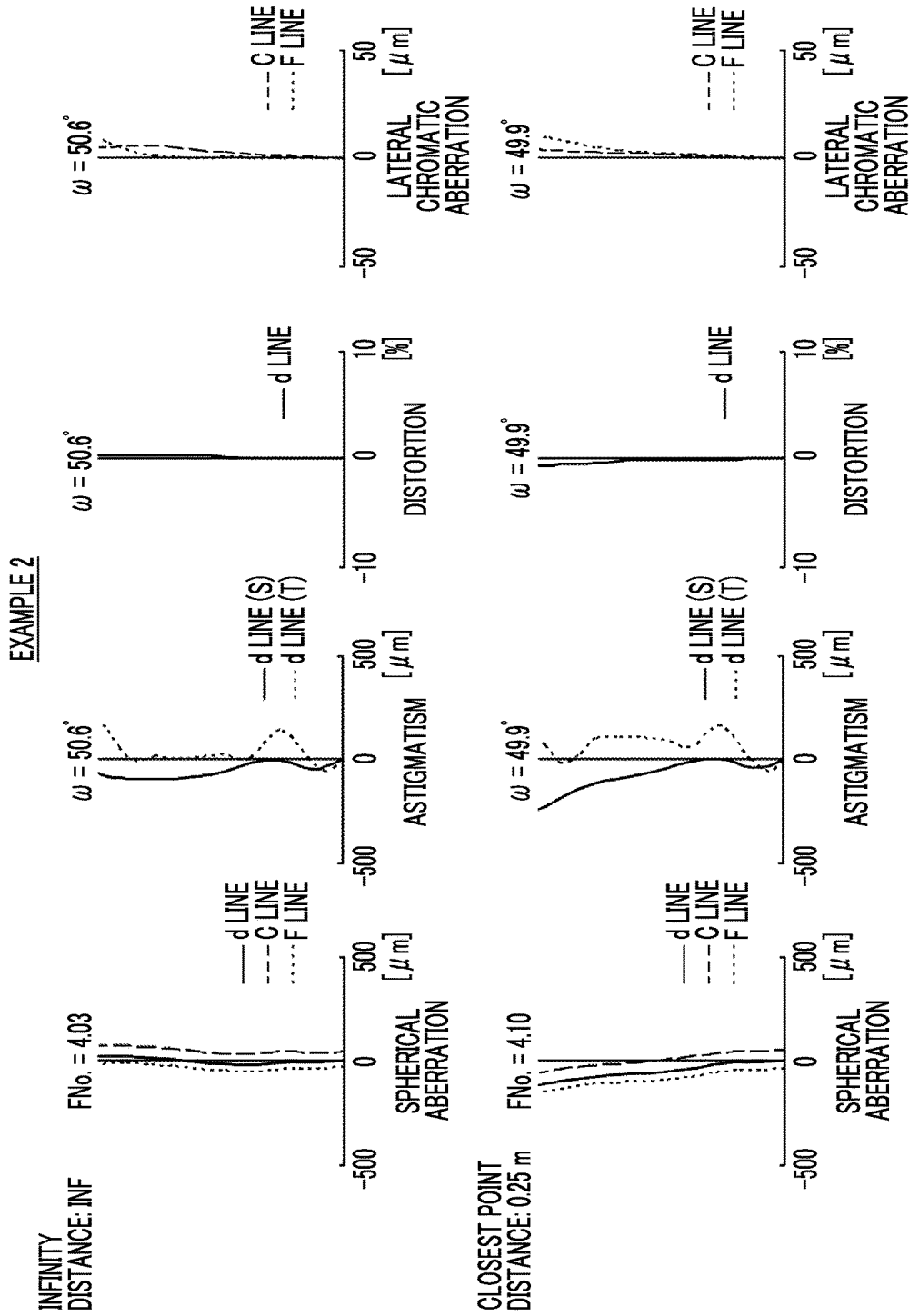
FIG. 5 is a diagram of aberrations of the imaging lens of Example 2 of the present invention.

Hereinafter, an embodiment of the present invention will be described in detail with reference to the accompanying drawings. FIG. 1 is a cross-sectional view illustrating a lens configuration of an imaging lens according to an embodiment of the present invention. The configuration example shown in FIG. 1 is in common with a configuration of an imaging lens of Example 1 described later. FIG. 1 shows a state of being focused on an infinite object. In the drawing, the left side is an object side, the right side is an image side, and an aperture stop St shown in the drawing does not necessarily indicate its size and/or shape, but indicates the position of a stop on an optical axis Z. In addition, an on-axis light flux a and a light flux b of the maximum angle of view are also shown together.

The imaging lens of the present embodiment consists of a first lens group G1 fixed to an image plane Sim during focusing, an aperture stop St, a second lens group G2 having a positive refractive power which moves along the optical axis Z during focusing, and a third lens group G3 fixed to the image plane Sim during focusing, in order from the object side. The first lens group G1 includes at least two negative lenses among three lenses from a lens closest to the object side to a third lens, a negative lens of the at least two negative lenses closest to the object side being a negative meniscus lens with its convex surface toward the object side, the second lens group G2 includes at least three lenses, and the third lens group G3 includes at least three lenses.

In a case where this imaging lens is applied to an imaging apparatus, it is preferable that cover glass, a prism, and/or various types of filters such as an infrared cut filter or a low-pass filter are disposed between an optical system and an image plane Sim, in accordance with the configuration of a camera side having a lens mounted thereon, and thus FIG. 1 shows an example in which a parallel plate-like optical member PP oriented to these components is disposed between a lens system and the image plane Sim.

In this manner, the imaging lens is constituted by the first lens group G1 fixed to the image plane Sim during focusing, the aperture stop St, the second lens group G2 having a positive refractive power which moves along the optical axis Z during focusing, and the third lens group G3 fixed to the image plane Sim during focusing, in order from the object side. Thereby, a focusing group is disposed in the vicinity of the aperture stop St having a tendency to decrease in effective diameter in a wide-angle lens, and thus it is possible to realize a reduction in the size and weight of the focusing group. In addition, the focusing group is disposed on the rear side (image side) of the aperture stop St, and thus it is possible to suppress an increase in the size of the first lens group G1. Further, since an excessive positive refractive power is not required for the third lens group G3 by setting the refractive power of the second lens group G2 to be positive, the spherical aberration is easily corrected.

In addition, the first lens group G1 includes at least two negative lenses among three lenses from the lens closest to the object side to the third lens, and thus it is possible to realize an increase in angle while suppressing an increase in the size of the first lens group G1. In addition, the negative lens of the at least two negative lenses closest to the object side is set to a negative meniscus lens with its convex surface toward the object side, and thus it is possible to suppress the generation of aberration even in a case where the angle of incidence of a light ray from the object side is high.

In addition, the second lens group G2 includes at least three lenses, and thus it is possible to suppress the fluctuation of spherical aberration which is generated during focusing.

In addition, the third lens group G3 includes at least three lenses, and thus it is possible to suppress the generation of a field curvature.

In the imaging lens of the present embodiment, in a case where the focal length of the whole system is set to f, and the focal length of the second lens group is set to f2, it is preferable to satisfy the following Conditional Expression (1). In Conditional Expression (1), the ratio of the lens focal length of the whole system to the focal length of the second lens group G2 which is a focusing group is specified, and the ratio value is not set to be equal to or less than the lower limit of Conditional Expression (1). Thereby, since the amount of movement of during focusing can be suppressed by securing the refractive power of the second lens group G2, it is possible to suppress an increase in the size of the lens system. The ratio value is not set to be equal to or greater than the upper limit of Conditional Expression (1). Thereby, since the refractive power of the second lens group G2 can be prevented from being in excess, the spherical aberration is easily suppressed. Meanwhile, in a case where the following Conditional Expression (1-1) or (1-2) is satisfied, it is possible to make characteristics more satisfactory.

$$0.1 < f/f2 < 0.6 \quad (1)$$

$$0.25 < f/f2 < 0.55 \quad (1\text{-}1)$$

$$0.4 < f/f2 < 0.52 \quad (1\text{-}2)$$

In addition, in a case where a distance on the optical axis from a stop to an image plane is set to BS, the focal length of the whole system is set to f, and the half angle of view of the whole system is set to ω, it is preferable to satisfy the following Conditional Expression (2). In Conditional Expression (2), the ratio of a distance on the optical axis from the aperture stop St to the image plane Sim to a paraxial image height is specified, and the ratio value is not set to be equal to or less than the lower limit of Conditional Expression (2). Thereby, since the angle of incidence of an off-axis principal light ray on the aperture stop St can be suppressed, it is easy to suppress the fluctuation of the field curvature during focusing. The ratio value is not set to be equal to or greater than the upper limit of Conditional Expression (2), and thus it is possible to suppress the entire length of the lens system. Meanwhile, in a case where the following Conditional Expression (2-1) is satisfied, it is possible to make characteristics more satisfactory.

$$2 < BS/(f \cdot \tan \omega) < 3 \quad (2)$$

$$2.2 < BS/(f \cdot \tan \omega) < 2.8 \quad (2\text{-}1)$$

In addition, in a case where the focal length of the second lens group is set to f2, and the focal length of the third lens group is set to f3, it is preferable to satisfy the following Conditional Expression (3). In Conditional Expression (3), the ratio of the focal length of the second lens group G2 to the focal length of the third lens group G3 is specified, and the ratio value is not set to be equal to or less than the lower limit of Conditional Expression (3). Thereby, it is possible to prevent the correction of the field curvature from being in excess. The ratio value is not set to be equal to or greater than the upper limit of Conditional Expression (3), it is possible to prevent the correction of the field curvature from being insufficient. Meanwhile, in a case where the following Conditional Expression (3-1) is satisfied, it is possible to make characteristics more satisfactory.

$$-0.2 < f2/f3 < 0.2 \quad (3)$$

$$-0.16 < f2/f3 < 0.16 \quad (3\text{-}1)$$

In addition, in a case where the focal length of the second lens group is set to f2, and the focal length of the first lens group is set to f1, it is preferable to satisfy the following Conditional Expression (4). In Conditional Expression (4), the ratio of the focal length of the second lens group G2 to the focal length of the first lens group G1 is specified, and the ratio value is not set to be equal to or less than the lower limit of Conditional Expression (4). Thereby, since an effective diameter passing through the second lens group G2 can be prevented from increasing excessively, the weight of the focusing group is easily reduced. The ratio value is not set to be equal to or greater than the upper limit of Conditional Expression (4). Thereby, since the refractive power of the first lens group G1 can be prevented from being in excess, the field curvature is easily corrected. Meanwhile, in a case where the following Conditional Expression (4-1) is satisfied, it is possible to make characteristics more satisfactory.

$$0 < f2/f1 < 1.5 \quad (4)$$

$$0.3 < f2/f1 < 0.9 \quad (4\text{-}1)$$

In addition, in a case where the Abbe number of the positive lens of the second lens group G2 is set to ν2p, it is preferable that the second lens group G2 includes at least one positive lens satisfying the following Conditional Expression (5). With such a configuration, on-axis chromatic aberration is easily corrected. The ratio value is not set to be equal to or less than the lower limit of Conditional Expression (5), and thus it is possible to prevent the correction of the on-axis chromatic aberration from being insufficient. The ratio value is not set to be equal to or greater than the upper limit of Conditional Expression (5), and thus it is possible to prevent the correction of on-axis chromatic aberration from being in excess. Meanwhile, in a case where the second lens group includes at least one positive lens satisfying the following Conditional Expression (5-1), it is possible to make characteristics more satisfactory.

$$70 < \nu 2p < 100 \quad (5)$$

$$80 < \nu 2p < 95 \quad (5\text{-}1)$$

In addition, it is preferable that the third lens group G3 includes a positive lens closest to the image side. With such a configuration, a back focus is easily secured.

In addition, it is preferable that the first lens group G1 includes at least two positive lenses. With such a configuration, lateral chromatic aberration is easily corrected.

In addition, it is preferable that the first lens group G1 is configured such that two lenses from the lens closest to the object side to a second lens are negative lenses. With such a configuration, it is possible to achieve an increase in angle while suppressing an increase in the size of a lens diameter. Meanwhile, in a case where three lenses from a lens closest to the object side to a third lens are set to negative lenses, it is possible to achieve a further increase in angle while suppressing an increase in the size of a lens diameter.

In addition, it is preferable that the second lens group G2 consists of three or four lenses. With such a configuration, it is possible to appropriately suppress the fluctuation of spherical aberration which is generated during focusing with a small number of lenses, which leads to contribution to a reduction in the size and weight of the entire lens system.

In addition, it is preferable that the third lens group G3 consists of four or five lenses. With such a configuration, it is possible to appropriately suppress the generation of a field curvature with a small number of lenses, which leads to contribution to a reduction in the size and weight of the entire lens system.

In a case where the imaging lens is used in a strict environment, it is preferable that protective multilayer film coating is performed. Further, antireflection coating for reducing ghost light in use or the like may be performed with the exception of protective coating.

In addition, in a case where this imaging lens is applied to an imaging apparatus, cover glass, a prism, and/or various types of filters such as an infrared cut filter or a low-pass filter may be disposed between the lens system and the image plane Sim, in accordance with the configuration of a camera side having a lens mounted thereon. Meanwhile, instead of disposing various types of filters described above between the lens system and the image plane Sim, various types of filters described above may be disposed between respective lenses, and coating having the same actions as those of various types of filters may be performed on the lens surface of any of the lenses.

Next, numerical value examples of the imaging lens of the present invention will be described.

First, an imaging lens of Example 1 will be described. FIG. 1 shows a cross-sectional view illustrating a configuration of the imaging lens of Example 1. Meanwhile, in FIG. 1 and FIGS. 2 and 3 corresponding to Examples 2 and 3 described later, a state of being focused on an infinite object is shown, the left side is an object side, the right side is an image side, and the aperture stop St shown in the drawing does not necessarily indicate its size and/or shape, but indicates the position of a stop on the optical axis Z. In addition, an on-axis light flux a and a light flux b of the maximum angle of view are also shown together.

The imaging lens of Example 1 consists of the first lens group G1 fixed to the image plane Sim during focusing, the aperture stop St, the second lens group G2 having a positive refractive power which moves along the optical axis Z during focusing, and the third lens group G3 fixed to the image plane during focusing, in order from the object side. The first lens group G1 consists of six lenses of lenses L11 to L16, the second lens group G2 consists of three lenses of lenses L21 to L23, and the third lens group G3 consists of five lenses of lens L31 to L35.

Table 1 shows lens data of the imaging lens of Example 1, Table 2 shows data relating to specifications, Table 3 shows data relating to surface spacings changing during focusing, and Table 4 shows data relating to aspherical coefficients. In the following, the meanings of symbols in the tables will be described by taking an example of those in Example 1, but the same is basically true of Examples 2 and 3.

In the lens data of Table 1, the column of a surface number indicates surface numbers sequentially increases toward the image side with the surface of a component closest to the object side set to a first surface, the column of a curvature radius indicates curvature radii of respective surfaces, and the column of a surface spacing indicates distances on the optical axis Z between the respective surfaces and the next surfaces. In addition, the column of n indicates refractive indexes of respective optical elements with respect to a d line (wavelength of 587.6 nm (nanometer)), and the column of ν indicates Abbe numbers of the respective optical elements with respect to the d line (wavelength of 587.6 nm (nanometer)). Here, the sign of the curvature radius is set to be positive in a case where s surface shape is convex on the object side, and is set to be negative in a case where a surface shape is convex on the image side. The lens data indicates the optical member PP together. In addition, in the lens data, DD [surface number] is written in the places of surface spacings having a change in spacing during focusing. Numerical values corresponding to DD [surface number] shown in Table 3.

The data relating to specifications of Table 2 indicates values a focal length f, an F-Number FNo, and the total angle of view 2ω.

In the lens data of Table 1, mark * is attached to the surface number of an aspherical surface, and the numerical values of a paraxial curvature radius are indicated as the curvature radius of the aspherical surface. The data relating to the aspherical coefficients of Table 4 indicates surface numbers of the aspherical surfaces and aspherical coefficients relating to these aspherical surfaces. "E±n" (n is an integer) in the numerical values of the aspherical coefficients of Table 4 means "×10$^{\pm n}$". The aspherical coefficients are values of respective coefficients KA and Am (m=3 to 16) in an aspherical expression represented by the following expression.

$$Zd = C \cdot h^2 / \{1 + (1 - KA \cdot C^2 \cdot h^2)^{1/2}\} \pm \Sigma Am \cdot h^m$$

Here, Zd is an aspherical depth (length of a vertical line drawn from a point on an aspherical surface having a height h down to a plane perpendicular to the optical axis with which the vertex of the aspherical surface is in contact), h is a height (distance from the optical axis), C is a reciprocal of the paraxial curvature radius, and KA and Am are aspherical coefficients (m=3 to 16).

TABLE 1

Example 1 · Lens Data (n and ν Are Based on d Line)

| Surface Number | Curvature Radius | Surface Spacing | n | ν |
|---|---|---|---|---|
| 1 | 37.6470 | 1.7400 | 1.69680 | 55.53 |
| 2 | 18.8736 | 4.7514 | | |
| *3 | 29.0985 | 2.0200 | 1.58313 | 59.38 |
| *4 | 14.3847 | 9.0566 | | |
| 5 | 332.1847 | 1.6400 | 1.49700 | 81.59 |
| 6 | 20.9717 | 0.7957 | | |
| 7 | 25.2743 | 10.7800 | 1.65412 | 39.73 |
| 8 | −18.4080 | 2.3400 | 1.84666 | 23.78 |
| 9 | −131.6846 | 6.3480 | | |
| 10 | −112.5732 | 3.3500 | 2.00069 | 25.43 |
| 11 | −33.8019 | 8.5118 | | |
| 12(Stop) | ∞ | DD[12] | | |
| 13 | 76.3971 | 2.2500 | 1.54072 | 47.23 |
| 14 | 31.4569 | 0.3603 | | |
| 15 | 29.9647 | 8.6000 | 1.43875 | 94.66 |
| 16 | −16.0360 | 1.5800 | 1.76200 | 40.10 |
| 17 | −22.0807 | DD[17] | | |
| *18 | −120.8019 | 4.0800 | 1.80625 | 40.91 |
| *19 | −40.3005 | 1.1655 | | |
| 20 | ∞ | 1.8000 | 1.72047 | 34.71 |
| 21 | 22.7320 | 6.1100 | 1.49700 | 81.59 |
| 22 | 64.9909 | 2.5180 | | |
| 23 | −173.3789 | 1.4000 | 1.60342 | 38.03 |
| 24 | 91.7200 | 3.4827 | | |
| 25 | 77.7950 | 7.5100 | 1.53775 | 74.70 |
| 26 | −77.7950 | 20.2074 | | |
| 27 | ∞ | 3.2000 | 1.51680 | 64.20 |
| 28 | ∞ | 0.0000 | | |

TABLE 2

Example 1 · Specification (d LINE)

| | Infinity | Closest Point (250 mm) |
|---|---|---|
| f | 23.69 | 23.63 |
| FNo. | 4.00 | 4.09 |
| 2ω [°] | 101.6 | 99.8 |

TABLE 3

Example 1 · Moving Surface Distances

| | Infinity | Closest Point (250 mm) |
|---|---|---|
| DD[12] | 7.4861 | 5.4732 |
| DD[17] | 3.9687 | 5.9816 |

TABLE 4

Example 1 · Aspherical Coefficient

| Surface Number | 3 | 4 |
|---|---|---|
| KA | 2.3870981E+00 | 8.4821095E−01 |
| A3 | 0.0000000E+00 | 0.0000000E+00 |
| A4 | 1.3164601E−05 | 6.7671516E−05 |
| A5 | 3.7489399E−05 | −8.6018398E−06 |
| A6 | −9.0886271E−06 | 1.3169953E−05 |
| A7 | 6.9230821E−07 | −5.4639754E−06 |
| A8 | 1.2051507E−08 | 9.8841110E−07 |
| A9 | −3.0922057E−09 | −9.3642276E−08 |
| A10 | −1.8716276E−10 | 5.3588470E−09 |
| A11 | 3.2360551E−11 | −3.7242141E−10 |
| A12 | −2.7750763E−13 | 3.8140685E−11 |
| A13 | −1.0746371E−13 | −2.1958768E−12 |
| A14 | 4.4146963E−15 | 1.9430076E−14 |
| A15 | 1.3699526E−18 | 2.9974805E−15 |
| A16 | −1.8537021E−18 | −8.7320490E−17 |

| Surface Number | 18 | 19 |
|---|---|---|
| KA | 3.1749483E+00 | −4.9871650E+00 |
| A3 | 0.0000000E+00 | 0.0000000E+00 |
| A4 | −2.0241709E−05 | −1.6116072E−05 |
| A5 | 1.0107437E−05 | −1.5085955E−06 |
| A6 | −6.5813373E−06 | 2.0396242E−06 |
| A7 | 1.7046433E−06 | −1.2725118E−06 |
| A8 | −2.1892518E−07 | 3.5828518E−07 |
| A9 | 1.1207529E−08 | −5.2035910E−08 |
| A10 | 4.5982414E−10 | 3.4286943E−09 |
| A11 | −1.0981936E−10 | 4.4752370E−11 |
| A12 | 1.1286182E−11 | −2.3342677E−11 |
| A13 | −1.1325544E−12 | 1.4508103E−12 |
| A14 | 8.4071210E−14 | −2.4220469E−14 |
| A15 | −3.3942895E−15 | −8.0819177E−16 |
| A16 | 5.5092813E−17 | 2.7188905E−17 |

FIG. 4 shows a diagram of aberrations of the imaging lens of Example 1. Meanwhile, spherical aberration, astigmatism, distortion, and lateral chromatic aberration in a state of being focused on an infinite object are shown in order from the upper left side of FIG. 4, and spherical aberration, astigmatism, distortion, and lateral chromatic aberration in a state of being focused on an object at a distance of 0.25 m (meter) are shown in order from the lower left side of FIG. 4. The diagram of aberrations indicating spherical aberration, astigmatism, and distortion indicates aberrations in which the d line (wavelength 587.6 nm (nanometer)) is used as a reference wavelength. In the spherical aberration diagram, aberrations relating to the d line (wavelength 587.6 nm (nanometer)), a C line (wavelength 656.3 nm (nanometer)), and an F line (wavelength 486.1 nm (nanometer)) are indicated by a solid line, a long dashed line, and a short dashed line, respectively. In the astigmatism diagram, aberrations in a sagittal direction and a tangential direction are indicated by a solid line and a short dashed line, respectively. In the lateral chromatic aberration diagram, aberrations relating to the C line (wavelength 656.3 nm (nanometer)) and the F line (wavelength 486.1 nm (nanometer)) are indicated by a long dashed line and a short dashed line, respectively. FNo. in the spherical aberration diagram means an F-Number, and ω in the other aberration diagrams means a half angle of view.

Symbols, meanings, and description methods of the respective pieces of data which have been set forth in the description of Example 1 are the same as those in the following examples unless otherwise noted, and thus the repeated description thereof will be omitted below.

Next, an imaging lens of Example 2 will be described. FIG. 2 shows a cross-sectional view illustrating a configuration of the imaging lens of Example 2. The imaging lens of Example 2 is configured to have lens groups and the number of lenses which are the same as those in Example 1, except that a third lens group G3 consists of four lenses of lenses L31 to L34, and the same is true of a lens moving during focusing. In addition, Table 5 shows lens data of the imaging lens of Example 2, Table 6 shows data relating to specifications, Table 7 shows data relating to surface spacings changing during focusing, Table 8 shows data relating to aspherical coefficients, and FIG. 5 shows a diagram of aberrations.

TABLE 5

Example 2 · Lens Data (n and ν Are Based on d Line)

| Surface Number | Curvature Radius | Surface Spacing | n | ν |
|---|---|---|---|---|
| 1 | 27.7788 | 1.6995 | 1.63930 | 44.87 |
| 2 | 15.7772 | 7.9589 | | |
| *3 | 77.2816 | 2.1130 | 1.58313 | 59.38 |
| *4 | 16.7128 | 10.9507 | | |
| 5 | −148.5984 | 1.7840 | 1.49700 | 81.54 |
| 6 | 36.8189 | 0.2002 | | |
| 7 | 31.7630 | 13.0564 | 1.67300 | 38.15 |
| 8 | −15.3482 | 3.2621 | 1.92286 | 18.90 |
| 9 | −46.8856 | 0.2068 | | |
| 10 | −59.0536 | 3.2736 | 1.95906 | 17.47 |
| 11 | −26.8523 | 10.2233 | | |
| 12(Stop) | ∞ | DD[12] | | |
| 13 | 44.6276 | 1.2004 | 1.95375 | 32.32 |
| 14 | 27.9460 | 0.1203 | | |
| 15 | 25.0248 | 9.3824 | 1.43875 | 94.66 |
| 16 | −14.5715 | 1.2500 | 1.91082 | 35.25 |
| 17 | −20.3581 | DD[17] | | |
| *18 | −7349.6985 | 3.7895 | 1.80625 | 40.91 |
| *19 | −33.9716 | 0.1998 | | |
| 20 | −130.4865 | 1.2501 | 1.60342 | 38.03 |
| 21 | 26.6684 | 6.7692 | | |
| 22 | −38.9889 | 1.3995 | 1.90043 | 37.37 |
| 23 | −146.2521 | 1.7893 | | |
| 24 | 75.5306 | 9.4255 | 1.53775 | 74.70 |
| 25 | −54.3543 | 19.9225 | | |
| 26 | ∞ | 3.2000 | 1.51680 | 64.20 |
| 27 | ∞ | 0.0000 | | |

TABLE 6

Example 2 · Specification (d LINE)

| | Infinity | Closest Point (250 mm) |
|---|---|---|
| f | 23.67 | 23.39 |
| FNo. | 4.03 | 4.10 |
| 2ω [°] | 101.2 | 99.8 |

TABLE 7

Example 2 · Moving Surface Distances

| | Infinity | Closest Point (250 mm) |
|---|---|---|
| DD[12] | 5.7998 | 4.0804 |
| DD[17] | 2.9216 | 4.6410 |

TABLE 8

Example 2 · Aspheric Coefficient

| Surface Number | 3 | 4 |
|---|---|---|
| KA | −4.9659750E+00 | −1.6369191E+00 |
| A3 | 4.6653302E−07 | −1.7209328E−05 |
| A4 | 3.4117971E−04 | 4.4767525E−04 |
| A5 | −1.8283852E−05 | −2.7257913E−05 |
| A6 | −2.3740586E−06 | 1.3451971E−05 |
| A7 | 2.8989142E−07 | −7.5986519E−06 |
| A8 | −1.0548746E−08 | 1.8973006E−06 |
| A9 | 1.0688172E−09 | −2.4434696E−07 |
| A10 | −1.5005147E−10 | 1.3996695E−08 |
| A11 | 2.7243231E−12 | 1.4649409E−10 |
| A12 | 6.7080052E−13 | −4.0730522E−11 |
| A13 | −2.7983389E−14 | −2.9743320E−12 |
| A14 | −1.7193877E−15 | 5.6809886E−13 |
| A15 | 1.4018026E−16 | −2.8331206E−14 |
| A16 | −2.6735381E−18 | 4.9262523E−16 |

| Surface Number | 18 | 19 |
|---|---|---|
| KA | −2.9629185E+00 | 1.1189283E−01 |
| A3 | 3.4323663E−05 | 3.2308856E−05 |
| A4 | −1.3890062E−04 | −1.2217347E−04 |
| A5 | 8.0772735E−05 | 7.9162740E−05 |
| A6 | −2.7613794E−05 | −2.6073453E−05 |
| A7 | 5.1606201E−06 | 4.5643804E−06 |
| A8 | −5.0511346E−07 | −3.8927651E−07 |
| A9 | 1.5377057E−08 | 5.4883910E−09 |
| A10 | 1.1808377E−09 | 9.5204657E−10 |
| A11 | −1.0190951E−11 | 1.0859800E−10 |
| A12 | −1.6884240E−11 | −2.4989432E−11 |
| A13 | 1.2563734E−12 | 1.2071395E−12 |
| A14 | −8.7637352E−15 | 2.2413646E−14 |
| A15 | −2.0474736E−15 | −3.4848505E−15 |
| A16 | 5.8768567E−17 | 8.0032862E−17 |

Figure 6:
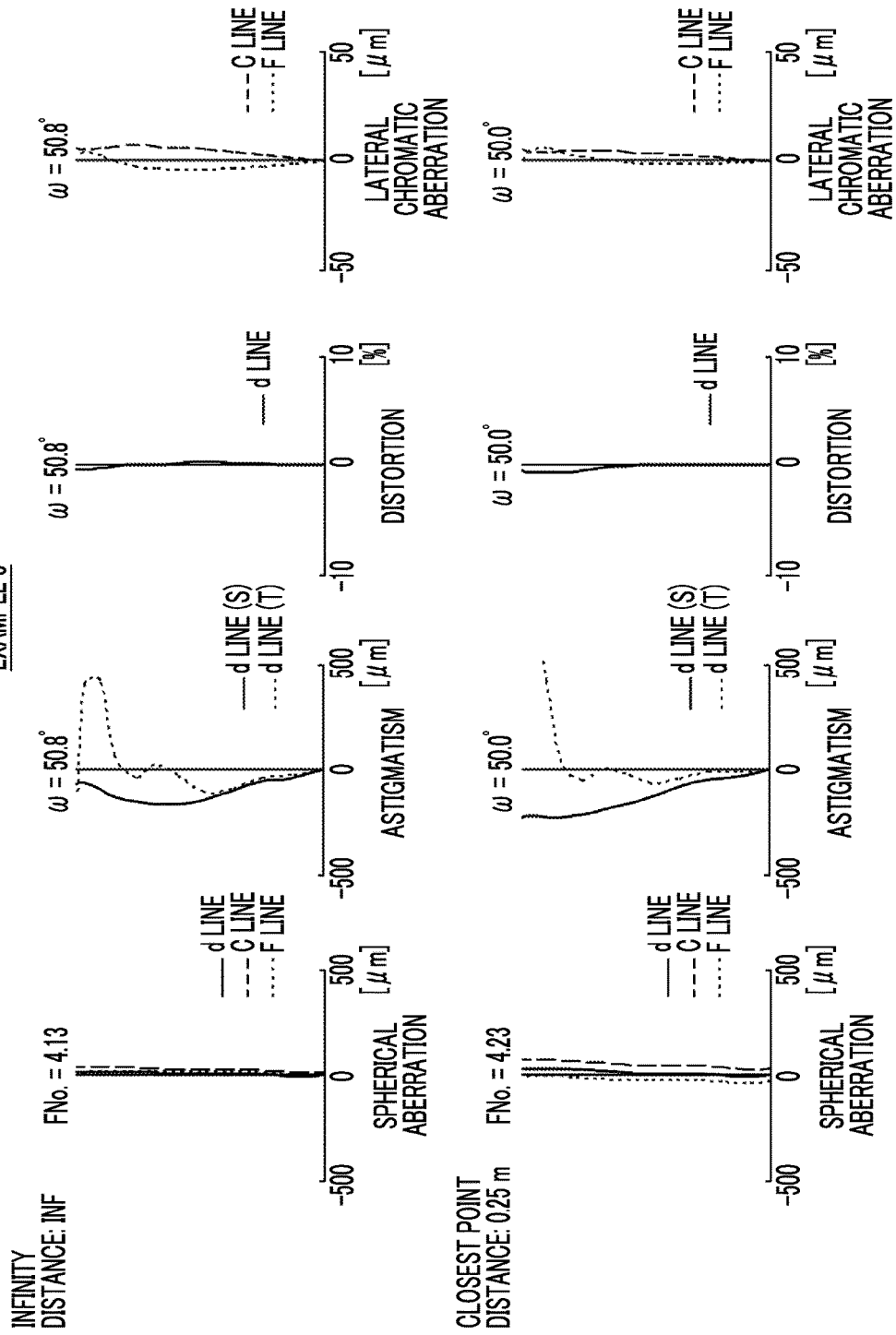
FIG. 6 is a diagram of aberrations of the imaging lens of Example 3 of the present invention.

Next, an imaging lens of Example 3 will be described. FIG. 3 shows a cross-sectional view illustrating a configuration of the imaging lens of Example 3. The imaging lens of Example 3 is configured to have lens groups and the number of lenses which are the same as those in Example 2, except that a second lens group G2 consists of four lenses of lenses L21 to L24, and the same is true of a lens moving during focusing. In addition, Table 9 shows lens data of the imaging lens of Example 3, Table 10 shows data relating to specifications, Table 11 shows data relating to surface spacings changing during focusing, Table 12 shows data relating to aspherical coefficients, and FIG. 6 shows a diagram of aberrations.

TABLE 9

Example 3 · Lens Data (n and ν Are Based on d Line)

| Surface Number | Curvature Radius | Surface Spacing | n | ν |
|---|---|---|---|---|
| 1 | 33.5246 | 1.9976 | 1.70156 | 56.42 |
| 2 | 20.3915 | 2.6250 | | |
| *3 | 33.6472 | 2.0499 | 1.58313 | 59.46 |
| *4 | 13.6706 | 14.0026 | | |
| 5 | −27.8907 | 1.2692 | 1.83513 | 24.33 |
| 6 | 22.3409 | 7.3274 | 1.92501 | 35.50 |
| 7 | −44.1947 | 3.5369 | | |
| 8 | 95.0079 | 3.4796 | 1.51600 | 52.00 |
| 9 | 62.2935 | 2.7109 | 1.94275 | 20.01 |
| 10 | −89.8872 | 10.5044 | | |
| 11(Stop) | ∞ | DD[11] | | |
| 12 | 28.2211 | 3.5112 | 1.55103 | 63.04 |
| 13 | 108.9573 | 1.2468 | 1.74252 | 27.87 |
| 14 | 27.3292 | 0.2088 | | |
| 15 | 20.4890 | 9.6957 | 1.49700 | 81.61 |
| 16 | −24.6321 | 2.3528 | | |
| *17 | −11.8517 | 1.9959 | 1.85135 | 40.10 |
| *18 | −16.4213 | DD[18] | | |
| 19 | 9707.5669 | 1.9969 | 2.00100 | 29.13 |
| 20 | 25.3930 | 13.1231 | 1.53775 | 74.70 |
| 21 | −51.0287 | 1.9956 | 1.92501 | 18.75 |
| 22 | −376.8073 | 0.0500 | | |
| 23 | 154.1218 | 8.1685 | 1.92501 | 20.47 |
| 24 | −57.8417 | 19.6332 | | |
| 25 | ∞ | 3.2000 | 1.51680 | 64.20 |
| 26 | ∞ | 0.0000 | | |

TABLE 10

Example 3 · Specification (d LINE)

| | Infinity | Closest Point (250 mm) |
|---|---|---|
| f | 23.70 | 23.69 |
| FNo. | 4.13 | 4.23 |
| 2ω [°] | 101.6 | 100.0 |

TABLE 11

Example 3 · Moving Surface Distances

| | Infinity | Closest Point (250 mm) |
|---|---|---|
| DD[11] | 6.9918 | 5.4318 |
| DD[18] | 0.2215 | 1.7815 |

TABLE 12

Example 3 · Aspherical Coefficient

| Surface Number | 3 | 4 |
|---|---|---|
| KA | 1.0166841E+00 | −5.9415027E−01 |
| A3 | 4.7032813E−04 | 4.9324641E−04 |
| A4 | 1.1030562E−05 | 8.6614365E−05 |
| A5 | −1.3996398E−06 | −1.8514833E−06 |
| A6 | 1.1051926E−07 | −6.9292864E−08 |
| A7 | −2.9695422E−08 | 8.7060046E−09 |
| A8 | 2.2785834E−09 | 2.7558227E−09 |
| A9 | 1.1013249E−11 | −7.9577185E−10 |
| A10 | −1.0984707E−11 | 6.6805477E−11 |
| A11 | 4.0978462E−13 | 2.2920102E−12 |
| A12 | 1.9913131E−14 | −7.4107471E−13 |
| A13 | 1.7535804E−15 | 2.5994736E−14 |
| A14 | −4.7963269E−16 | 3.4557508E−15 |
| A15 | 2.6019479E−17 | −3.1376200E−16 |
| A16 | −4.5187008E−19 | 7.3156192E−18 |

| Surface Number | 17 | 18 |
|---|---|---|
| KA | −1.4422475E+00 | −2.3580472E+00 |
| A3 | −6.6603502E−05 | −9.0728425E−05 |
| A4 | 7.4068969E−06 | 1.0575018E−04 |
| A5 | 4.1287968E−05 | −4.1354411E−06 |
| A6 | −1.8148227E−05 | 2.1297189E−06 |
| A7 | 4.6508626E−06 | −5.1330033E−07 |
| A8 | −6.0861441E−07 | 7.1622727E−08 |
| A9 | 8.1395338E−09 | −4.2798069E−09 |
| A10 | 9.5097750E−09 | −1.8965541E−10 |
| A11 | −1.2652257E−09 | 4.8796923E−11 |

TABLE 12-continued

Example 3 · Aspherical Coefficient

| A12 | 3.1128594E−11 | −4.0444620E−12 |
| A13 | 7.0949928E−12 | 3.6722351E−13 |
| A14 | −7.6829295E−13 | −3.9676760E−14 |
| A15 | 3.1992796E−14 | 2.5301230E−15 |
| A16 | −5.0905472E−16 | −6.2126073E−17 |

Table 13 shows values corresponding to Conditional Expressions (1) to (5) of the imaging lenses of Examples 1 to 3. Meanwhile, the d line is used as a reference wavelength in all the examples, and values shown in the following Table 13 are equivalent to those at this reference wavelength.

TABLE 13

| Expression Number | Condition Expression | Example 1 | Example 2 | Example 3 |
|---|---|---|---|---|
| (1) | f/f2 | 0.449 | 0.416 | 0.505 |
| (2) | BS/(f * tan ω) | 2.608 | 2.379 | 2.558 |
| (3) | f2/f3 | 0.059 | −0.072 | 0.149 |
| (4) | f2/f1 | 0.315 | 0.894 | 0.438 |
| (5) | ν2p | 94.660 | 94.660 | 81.610 |

From the above-mentioned data, it can be understood that the imaging lenses of Examples 1 to 3 all satisfy Conditional Expressions (1) to (5), and are imaging lenses in which resolution is high and the total angle of view is as wide an angle as 80° or more.

Figure 7:
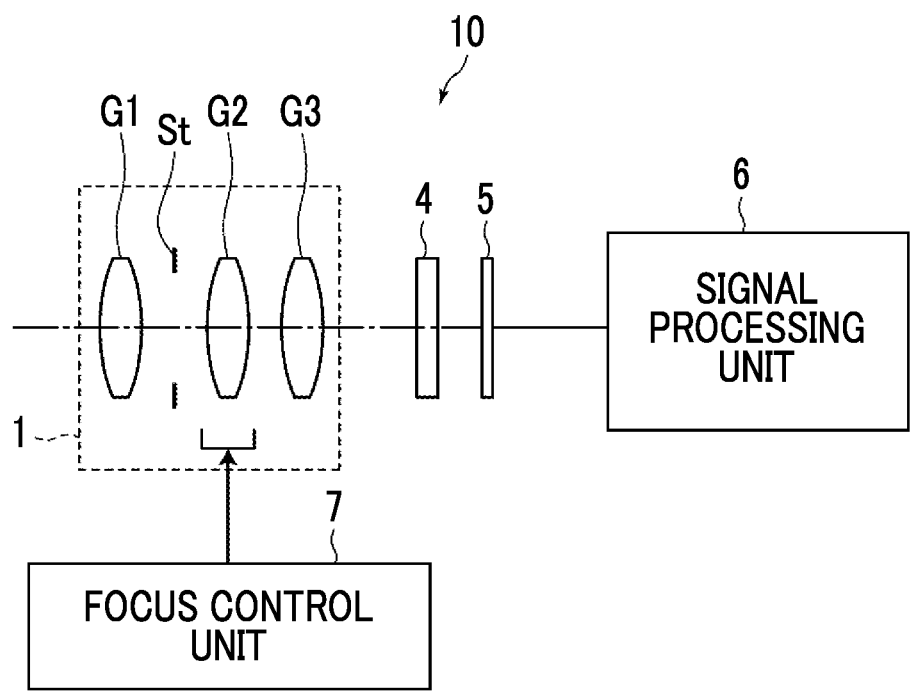
FIG. 7 is a schematic configuration diagram of an imaging apparatus according to an embodiment of the present invention.

Next, an imaging apparatus according to an embodiment of the present invention will be described. FIG. 7 shows a schematic configuration diagram of an imaging apparatus 10 using an imaging lens 1 according to an embodiment of the present invention, as an example of the imaging apparatus according to an embodiment of the present invention. Examples of the imaging apparatus 10 include electronic cameras such as a motion-picture camera, a broadcast camera, a digital camera, a video camera, and a surveillance camera.

The imaging apparatus 10 includes the imaging lens 1, a filter 4 disposed on the image side of the imaging lens 1, an imaging device 5, a signal processing unit 6 that arithmetically processes an output signal from the imaging device 5, and a focus controller 7 for focusing the imaging lens 1. FIG. 7 conceptually shows a first lens group G1, an aperture stop St, a second lens group G2, and a third lens group G3 which are included in the imaging lens 1. The imaging device 5 captures an image of a subject formed by the imaging lens 1 to convert the captured image into an electrical signal, and, for example, a charge coupled device (CCD), a complementary metal oxide semiconductor (CMOS) or the like can be used as the imaging device. The imaging device 5 is disposed so that the imaging surface thereof is coincident with the image plane of the imaging lens 1. The imaging apparatus 10 of the present embodiment includes the imaging lens 1, and thus can acquire a satisfactory image with a wide angle.

Hereinbefore, the present invention has been described through embodiments and examples, but the present invention is not limited to the above-described embodiments and examples, and can be variously modified. For example, the curvature radius, the surface spacing, the refractive index, the Abbe number, the aspherical coefficient, and the like of each lens are not limited to the values shown in each of the numerical value examples, and other values can be used therefor.

For example, the above example illustrates the lens system in which focusing from an infinite object to a short-distance object is performed, but it goes without saying that the present invention can be applied to an imaging lens in which focusing from a finite long-distance object to a short-distance object is performed.

In addition, the imaging apparatus according to an embodiment of the present invention is also not limited to the above examples, and can be replaced with various aspects.

EXPLANATION OF REFERENCES

1: imaging lens
4: filter
5: imaging device
6: signal processing unit
7: focus control unit
10: imaging apparatus
a: on-axis light flux
b: light flux of the maximum angle of view
G1: first lens group
G2: second lens group
G3: third lens group
L11 to L35: lens
PP: optical member
Sim: image plane
St: aperture stop
Z: optical axis

What is claimed is:

1. An imaging lens comprising, in order from an object side:
   a first lens group fixed to an image plane during focusing;
   a stop;
   a second lens group having a positive refractive power which moves along an optical axis during focusing; and
   a third lens group fixed to the image plane during focusing,
   wherein the first lens group includes at least two negative lenses among three lenses from a lens closest to the object side to a third lens, a negative lens of the at least two negative lenses closest to the object side being a negative meniscus lens with its convex surface toward the object side,
   the second lens group includes at least three lenses, and the third lens group includes at least three lenses,
   wherein in a case where a focal length of the whole system is set to f, and a focal length of the second lens group is set to f2, the following Conditional Expression (1) is satisfied, $$0.1 < f/f2 < 0.6 \tag{1}$$

2. The imaging lens according to claim 1,
   wherein in a case where a distance on the optical axis from the stop to the image plane is set to BS, a focal length of the whole system is set to f, and a half angle of view of the whole system is set to ω, the following Conditional Expression (2) is satisfied, $$2 < BS/(f \tan ω) < 3 \tag{2}$$

3. The imaging lens according to claim 2,
   wherein the following Conditional Expression (2-1) is satisfied, $$2.2 < BS/(f \tan ω) < 2.8 \tag{2-1}$$

4. The imaging lens according to claim 1,
wherein in a case where a focal length of the second lens group is set to f2, and a focal length of the third lens group is set to f3, the following Conditional Expression (3) is satisfied, $$-0.2 < f2/f3 < 0.2 \qquad (3).$$

5. The imaging lens according to claim 4,
wherein the following Conditional Expression (3-1) is satisfied, $$-0.16 < f2/f3 < 0.16 \qquad (3\text{-}1).$$

6. The imaging lens according to claim 1,
wherein in a case where a focal length of the second lens group is set to f2, and a focal length of the first lens group is set to f1, the following Conditional Expression (4) is satisfied, $$0 < f2/f1 < 1.5 \qquad (4).$$

7. The imaging lens according to claim 6,
wherein the following Conditional Expression (4-1) is satisfied, $$0.3 < f2/f1 < 0.9 \qquad (4\text{-}1).$$

8. The imaging lens according to claim 1,
wherein in a case where an Abbe number of a positive lens of the second lens group is set to v2p, the second lens group includes at least one positive lens satisfying the following Conditional Expression (5), $$70 < v2p < 100 \qquad (5).$$

9. The imaging lens according to claim 8,
wherein the second lens group includes at least one positive lens satisfying the following Conditional Expression (5-1)

$$80 < v2p < 95 \qquad (5\text{-}1).$$

10. The imaging lens according to claim 1, wherein the third lens group includes a positive lens closest to an image side.

11. The imaging lens according to claim 1, wherein the first lens group is configured such that two lenses from the lens closest to the object side to a second lens are negative lenses.

12. The imaging lens according to claim 1, wherein the second lens group consists of three or four lenses.

13. The imaging lens according to claim 1, wherein the third lens group consists of four or five lenses.

14. The imaging lens according to claim 1,
wherein the following Conditional Expression (1-1) is satisfied, $$0.25 < f/f2 < 0.55 \qquad (1\text{-}1).$$

15. The imaging lens according to claim 1,
wherein the following Conditional Expression (1-2) is satisfied, $$0.4 < f/f2 < 0.52 \qquad (1\text{-}2).$$

16. An imaging apparatus comprising the imaging lens according to claim 1.

17. An imaging lens comprising, in order from an object side:
a first lens group fixed to an image plane during focusing;
a stop;
a second lens group having a positive refractive power which moves along an optical axis during focusing; and
a third lens group fixed to the image plane during focusing,
wherein the first lens group includes at least two negative lenses among three lenses from a lens closest to the object side to a third lens, a negative lens of the at least two negative lenses closest to the object side being a negative meniscus lens with its convex surface toward the object side,
the second lens group includes at least three lenses, and
the third lens group includes at least three lenses,
wherein the first lens group includes at least two positive lenses.

18. An imaging apparatus comprising the imaging lens according to claim 17.

19. An imaging lens comprising, in order from an object side:
a first lens group fixed to an image plane during focusing;
a stop;
a second lens group having a positive refractive power which moves along an optical axis during focusing; and
a third lens group fixed to the image plane during focusing,
wherein the first lens group includes at least two negative lenses among three lenses from a lens closest to the object side to a third lens, a negative lens of the at least two negative lenses closest to the object side being a negative meniscus lens with its convex surface toward the object side,
the second lens group includes at least three lenses, and
the third lens group includes at least three lenses,
wherein the first lens group is configured such that three lenses from the lens closest to the object side to the third lens are negative lenses.

20. An imaging apparatus comprising the imaging lens according to claim 19.

* * * * *